United States Patent [19]

Rühle et al.

[11] 4,445,060
[45] Apr. 24, 1984

[54] ELECTRIC STARTER MOTOR WITH HOLDER FOR PERMANENT MAGNETS

[75] Inventors: Walter Rühle, Korntal; Kurt Zimmerman, Bietigheim, both of Fed. Rep. of Germany

[73] Assignee: Robert Bosch GmbH, Stuttgart, Fed. Rep. of Germany

[21] Appl. No.: 413,333

[22] PCT Filed: Oct. 31, 1981

[86] PCT No.: PCT/DE81/00183
§ 371 Date: Aug. 11, 1982
§ 102(e) Date: Aug. 11, 1982

[87] PCT Pub. No.: WO82/02288
PCT Pub. Date: Jul. 8, 1982

[30] Foreign Application Priority Data

Dec. 20, 1980 [DE] Fed. Rep. of Germany ....... 3048337

[51] Int. Cl.³ ..................... H02K 15/00; H02K 21/26
[52] U.S. Cl. ....................................... 310/154; 310/42
[58] Field of Search ................. 310/42, 154, 156, 258, 310/259, 254; 339/5, 6, 8

[56] References Cited

U.S. PATENT DOCUMENTS

| 2,971,107 | 2/1961 | Jin | 310/258 |
| 3,258,622 | 6/1966 | Gillespie | 310/154 |
| 3,790,830 | 2/1974 | Bonfiglio | 310/42 |
| 4,071,794 | 1/1978 | Schoen . | |
| 4,219,752 | 8/1980 | Katou | 310/156 |

FOREIGN PATENT DOCUMENTS 1959700  6/1971  Fed. Rep. of Germany .
1923753  12/1969  France .

Primary Examiner—J. D. Miller
Assistant Examiner—D. L. Rebsch
Attorney, Agent, or Firm—Frishauf, Holtz, Goodman & Woodward

[57] ABSTRACT

The housing (2) retains six permanent magnets (3-8) which are curved and rest on the inner wall (9) of the housing (2). They are fixed and held in the circumferential position by holder parts (13; 14; 47) located by guide protrusions (11, 12) in the housing (2). The holder parts have yielding holder sections (15; 25; 49) with circumferentially extending axially springy flaps (21; 22; 29, 30) or bridge elements (48) to hold the permanent magnets (3-8) and yet permit compensation for tolerances while being resistant to vibratrion. For axial positioning, the holder parts have a spacer (23; 32) resting on the bearing cap (39).

19 Claims, 4 Drawing Figures

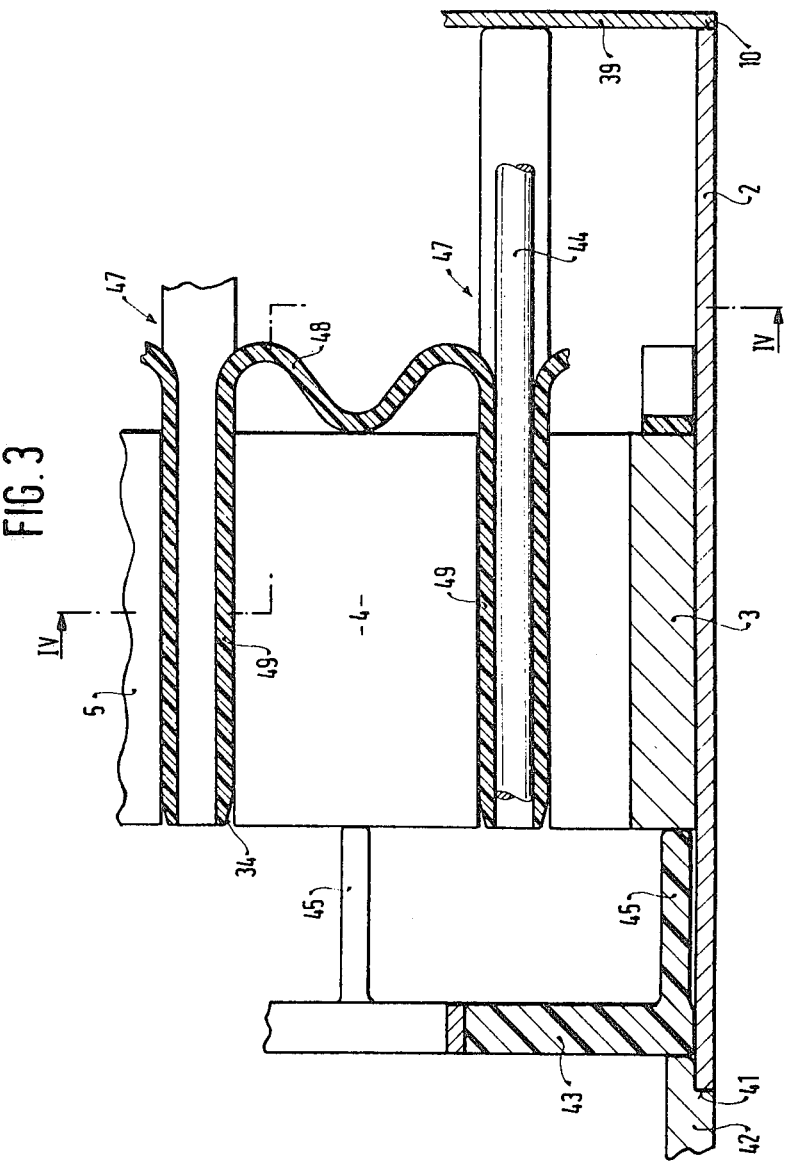
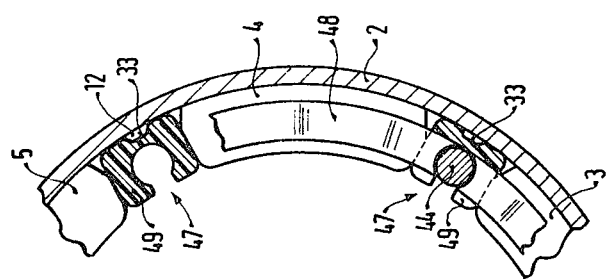

ELECTRIC STARTER MOTOR WITH HOLDER FOR PERMANENT MAGNETS

The invention relates to an electric motor, and more particularly to a motor suitable as a starter for an internal combustion engine.

BACKGROUND

An electric motor is already known in which two pairs of permanent magnets are received in a housing in such a manner that two adjacent magnets lie on one long side similar to a spring-and-groove connection, while the arms of a yielding holder element rest on the other long side of the two adjacent magnets. The holder element, protruding beyond either end of the permanent magnets, has flaps formed thereon in the circumferential direction, which are bent over the ends of each of two adjacent magnets. The magnets are more or less firmly clamped into place between the flaps; this does not permit any compensation for manufacturing tolerances in the length of the magnets, and may result in damage to the permanent magnets. The holder parts also protrude beyond the flap resting on one end of the permanent magnets and terminate in a holder section having lateral slits for receiving the brush holder of the electric motor. The motor requires special means on the housing for longitudinally securing the permanent magnets in the housing. The connection of the brush holder with the holder parts for the permanent magnets is not sufficiently vibration-resistant for the rough operation conditions existing in motor vehicles.

THE INVENTION

It is an object to provide a holding arrangement for field permanent magnets of a motor, typically a starter motor for an automotive-type internal combustion engine, which is reliable, simple, and contributes to ease of assembly of the starter motor structure.

Briefly, the magnets are part-cylindrical elements fitted against the inside of a cylindrical shell of the motor. To position the magnets in place, a plurality of elongated strip-like holder elements are fitted between the arched part-cylindrical magnets, resiliently engaging neighboring side walls of respective neighboring permanent magnet elements. The strip-elements have a spacer portion which is supported at one end against an end cap or end bell of the motor. Oppositely directed springy flaps project from the strip-like elements and engage against the end faces of the magnets. The other end faces of the magnets are retained in position by projecting elements, for example projecting from a bearing support structure, or a transverse plate across the cylindrical housing shell of the motor. If the motor is a starter motor, the transverse plate may hold an intermediate bearing.

Preferably, the strip-like elements include elongated plastic portions which have a central opening. The central opening is used to guide tension bolts which hold the end caps or end bells of the motor, or motor-and-starter gear assembly, together.

The electric motor has the advantage that the holder parts of the permanent magnets simultaneously fix the magnets both in the longitudinal and circumferential direction in the housing. The magnets are no longer clamped firmly between rigid flaps of the holder parts but instead are yieldingly supported, and thus compensate for tolerances, on the parts which close the ends of the housing; the permanent magnets are securely held in place during rough motor vehicle operating conditions independently of the effects of temperature or acceleration and vibration.

It is particularly advantageous to make at least the holder parts of elastic plastic material, through which the fastening elements are guided, with which the bearing cap and the drive bearings are secured to the housing of the electric motor.

The tension bolts which hold the entire motor structure together, typically, are made of steel. Since the permanent magnet structures used for fields of starter motors have substantial magnetic force, it is difficult to thread steel rods between the magnets. Use of plastic holder parts has the additional advantage that the plastic holder elements will function as guide sleeves for the tension bolts, insuring placement of the tension bolts between the magnets, and permitting easy threading of the tension bolts through the plastic holder elements without danger of adherence of the tension bolts against the one or the other of the adjacent magnets during the assembly operation. Use of the plastic holder elements which, simultaneously, form guides and spacers for the tension bolts permits automatic assembly.

DRAWINGS

Exemplary embodiments of the invention are shown in the drawing.

FIG. 3 shows the electric motor with a modification of the holder parts of FIG. 1, seen partly in longitudinal section; and FIG. 4 is a cross-sectional view taken along the line IV—IV of FIG. 3.

DETAILED DESCRIPTION OF EXEMPLARY EMBODIMENTS

Figure 2:
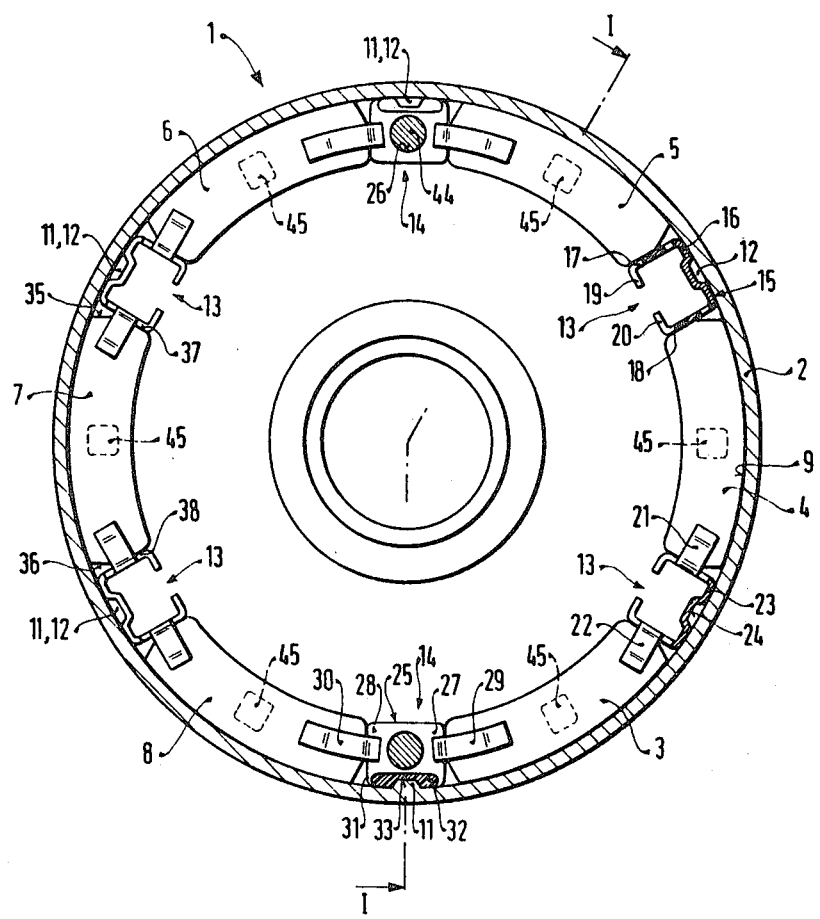
FIG. 2 shows a cross section taken along the line II—II of FIG. 1.

The invention will be described with reference to a starter for an automotive internal combustion engine. The electric motor 1 has a housing 2, in which six curved permanent magnets 3–8 (FIG. 2) are received. Six guide protrusions 11 and 12, respectively, are disposed on the inner wall 9 of the housing 2. Protrusions 11 are located in a first zone near one end face 10, and protrusions 12 in a second zone in the middle of the length of the magnets 3–8, the guide protrusions 11 and 12 being spaced uniformly apart radially and being aligned with one another longitudinally. The magnets 3–8 rest on the inner wall 9 of the housing 2 between the guide protrusions 12 and spaced apart laterally from the guide protrusions 12. The magnets 3–8 are secured by means of yielding holder parts 13 and 14.

The holder parts 13 are formed of heat-resistant, springy sheet metal. They have a holder section 14 having a cross section bent approximately into a square. The sides of the arms 17 and 18 forming the square are bent onto the base 16 of the holder section 15. The respective ends 19 and 20 of the arms 17 and 18 are bent over facing one another and form a slotted fourth side of the square. The arms 17 and 18 are thus embodied such as to be pivotable on the base 16. The holder section 15 is approximately as long as the permanent magnets 3–8. Two flaps 21 and 22 adjoin the holder section 15 of the holder part 13. They are embodied as extensions of, but narrower than, the arms 17 and 18, respectively, and are bent at right angles away from the arms 17 and 18, and bent approximately into an S shape. The base 16 is elongated to form a spacer 23, which protrudes far beyond the holder section 15 at the end having the flaps 21 and 22. A continuous guide groove 24 is machined into the base 16 and the adjacent spacer 23.

The holder parts 14 are extruded, heat-resistant, elastic plastic elements. Their holder section 25 likewise has a square cross section and a longitudinal bore 26. Approximately S-shaped lateral flaps 29 and 30 are again molded onto one end of the sides 27 and 28 of the holder section 25. The base 31, like its extension embodied as a spacer 32, has a guide groove 33 on its outside. The holder parts 14 are provided on their holder section 25 with a bevelled insertion end 34.

The longitudinal sides 35 and 36 of the permanent magnets 3–8 are each provided with a flat face 37 and 38, respectively. The faces 37 and 38 of each permanent magnet 3–8 enclose an acute angle which is somewhat smaller than 60°. The size of the acute angle depends essentially on the diameter of the housing and the number of permanent magnets, and permit the curved positioning of the permanent magnets.

Assembly of magnets in the motor: The holder parts 13 and 14 are pushed into the housing 2 such that they rest on the inner wall 9. The guide grooves 24 and 33 of the holder parts 13 and 14 thereby slide along the guide protrusions 11 and 12 of the housing 2. The holder sections 15 and 25 are pushed between the two long sides 35 and 36 of each two adjacent permanent magnets 3–8, and their arms 17 and 18 or their sides 27 and 27, respectively, rest under spring tension on the flat faces 37 and 38 of the permanent magnets 3–8. The holder parts 13 and 14, and thus the permanent magnets 3–8, are fixed in the housing 2 in their circumferential direction by means of the guide protrusions 11 and 12 engaging the guide grooves 24 and 33. The housing 2 is closed off at its end 10 by a bearing cap 39. The ends of the spacers 23 and 32 of the holder parts 13 and 14 rest on the bearing cap 39. The flaps 20 and 21 of the holder parts 13 and the flaps 29 and 30 of the holder parts 14 rest on the ends 40 oriented toward the bearing cap 39 of each two adjacent permanent magnets 3–8.

Flanged to the other end 41 of the housing 2 is a drive bearing 42, in which a meshing gear of the starter is accomodated in a manner known per se and not shown in further detail. An intermediate bearing 43 is inserted between the housing end 41 and the drive bearing 42. The bearing cap 39 flanged to the ends 10 and 41 of the housing 2, on the one hand, and the intermediate bearing 43 and the drive bearing 42 on the other, are secured to the housing 2 by means of tie rods 44. The tie rods 44 in the housing 2 are inserted through the longitudinal bores 26 of the holder parts 14 made of plastic. The holder parts 14 of plastic make it easier to install the relatively long tie bolt 44 made of magnetizable material.

The intermediate bearing 43 is of plastic. It has six protrusions 45 molded onto the side oriented toward the housing and spaced apart uniformly in the circumferential direction. These protrusions 45 form rest or abutment surfaces for the ends 46 of the permanent magnets 3–8 which are oriented toward them and keep the magnets 3–8 fixed in their longitudinal position in the housing 2. At the same time, the protrusions 45 press the permanent magnets 3–8 against the yielding flaps 21 and 22, 29 and 30 of the holder parts 13 and 14 such as to compensate for tolerances. The permanent magnets 3–8 are thus both fastened in place in the circumferential direction in the housing by means of the yielding holder section 15 and 25 of the holder parts 13 and 14, employing the arch-curvature effect. The magnets are held in a tolerance-compensating manner in the longitudinal direction in the housing 2 by means of the spacers 23 supported on the bearing cap 39 and the flaps 21, 22 and 29, 30, respectively, of the holder parts 13 and 14 resting on the ends 40 of the permanent magnets 3–8. The protrusions 45 of the intermediate bearing 43 form counter rest surfaces for the ends 46 of the permanent magnets 3–8.

In motors which lack the intermediate bearings, the protrusions 45 are located on the side of the drive bearing 42, oriented toward the permanent magnets 3–8.

Figure 1:
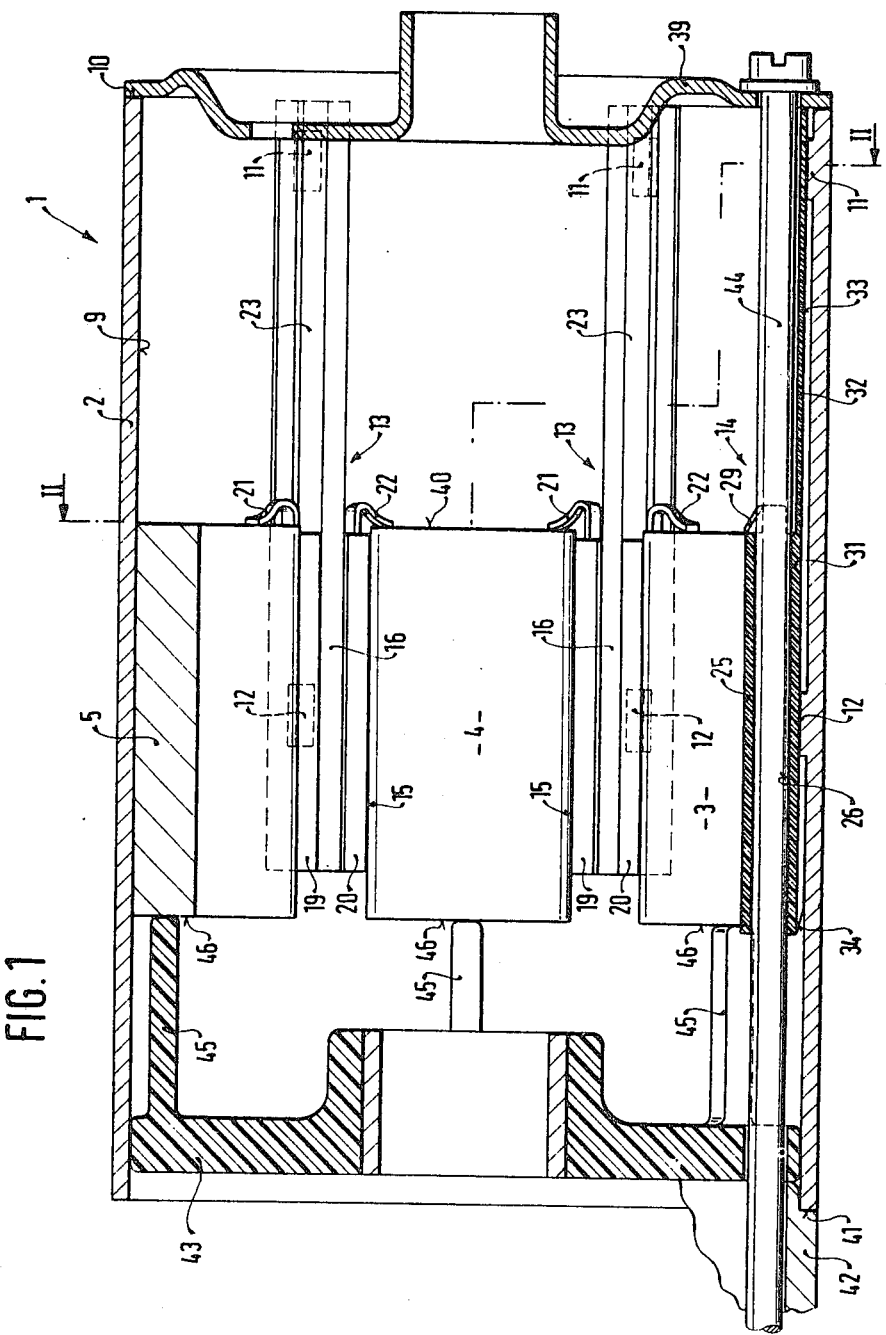
FIG. 1 shows an electric motor in longitudinal section.

Embodiment of FIGS. 3 and 4: Holders 47 for the permanent magnets 3–8 are, like the holder parts 14, made as extruded parts of plastic. In place of the S-shaped flaps 29 and 30 (FIGS. 1, 2), which rest on the end face 40 of the permanent magnets 3–8, holders 47 have an approximately W-shaped indented spring bridge 48 connecting two adjacent holder parts 47. The central, indented portion of bridge 48 rests on the end 40 of a respective permanent magnet 3–8 located between any two holder parts 47 such as to compensate for tolerances. All the holder parts 47 are combined to form a single holder ring for the permanent magnets 3–8, which is thus easy to install. The holder section 49 of the holder parts 47 is slotted (see FIG. 4), in order to attain the required spring effect in the circumferential direction.

We claim:
1. In an electric motor, especially starter motor for an automotive-type internal combustion engine,
wherein the motor has an essentially cylindrical housing shell (2);
an end cap (39) closing off the shell at one end (10);
a plate-like means (43) positioned transversely of the shell at an axial position remote from said one end;
a plurality of bowed or arched permanent magnets (3–8) having part-cylindrical configuration fitted into the housing shell and having curved inner and outer walls, essentially radially directed side walls (37, 38) and axially transversely extending end faces (40, 46),
a magnet holding arrangement comprising
abutment means (45) located radially inwardly of the housing shell and extending axially, bearing against one of the end faces of the permanent magnets (3–8) for providing a counter and locating surface;
a plurality of elongated strip-like holder elements (13; 14, 47) fitted between said part-cylindrical arched permanent magnets (3–8) and engaging neighboring side walls of respective neighboring permanent magnets,
said strip-like elements comprising
a spacer portion (23, 32) supported with one end against the end cap (39) and extending from the other end faces (40) of the permanent magnets towards said end cap;
circumferentially positioned oppositely directed spring flaps (21, 22; 29, 30; 48) projecting from said strip-like elements at a position to resiliently engage said other of the end faces (40) of the permanent magnets and press axially against said other end faces to thereby resiliently press said one end face of said magnets in engagement with the abutment means;

wherein the strip-like elements are hollow, define an axially extending opening, and are formed, at least in the region between said magnets, with circumferentially resilient deflectable side walls, resiliently pressing against the neighboring side walls of neighboring permanent magnets;

and axially extending tension bolts (44) extending through said openings and connected to the end cap (39).

2. Motor according to claim 1, wherein said elongated strip-like holder elements (13; 14, 47) have essentially rectangular cross section with two longitudinal sides bearing against said neighboring side walls of respectively neighboring permanent magnets (3-8).

3. Motor according to claim 1, wherein said elongated strip-like holder elements (47) have essentially rectangular cross section with two longitudinal sides bearing against said neighboring side walls of respectively neighboring permanent magnets (3-8);

and wherein said strip-like holder elements are made entirely of plastic material.

4. Motor according to claim 1, wherein said elongated strip-like holder elements (13, 14) have essentially rectangular cross section with two longitudinal sides bearing against said neighboring side walls of respectively neighboring permanent magnets (3-8);

and wherein said elongated strip-like holder elements are formed of metal.

5. Motor according to claim 1, wherein said elongated strip-like holder elements (13, 14) have essentially rectangular cross section with two longitudinal sides bearing against said neighboring side walls of respectively neighboring permanent magnets (3-8);

wherein said elongated strip-like holder elements comprise a core structure (14) made of plastic and having said opening formed therein;

and a metal sheath element (13) surrounding, at least over its major extent, said plastic element.

6. Motor according to claim 1, wherein the strip-like elements are formed with an open slit facing the axis of the motor, and a wall of said strip-like element defines a base (16, 31), said base being guided on the inner wall (9) of the housing (2).

7. Motor according to claim 1, wherein the inner wall (9) of the housing and a wall of said strip-like element engaging the inner wall of the housing are formed, respectively, with projection-and-recess means (11, 12; 16, 31) to guide the position of said elongated strip-like elements and thus locate the permanent magnets (3-8) circumferentially within the housing.

8. Motor according to claim 7, wherein the projection-and-recess means comprises radially inwardly extending projections (11, 12), extending from the walls (9) of the housing;

and an elongated guide groove (16, 31) formed in the wall of the strip-like element engaged with said projections, said guide groove extending over the entire length of the holder part (13; 14, 47).

9. Motor according to claim 1, wherein said spring flaps (48) of the holder elements are connected to form a ring structure assembly and to connect all said holder parts together.

10. Motor according to claim 9, wherein said connecting spring flaps, in plan view, have essentially W shape.

11. Motor according to claim 1, wherein the abutment means (45) comprise axially extending projections projecting toward said permanent magnets (3, 8) from the plate-like means (43) positioned transversely of the shell.

12. Motor according to claim 1, wherein said strip-like holder elements are made entirely of plastic material;

and wherein said tension bolts comprise ferromagnetic material, the strip-like element forming a guide bushing for said tension bolt passing between neighboring permanent magnets (3-8).

13. Motor according to claim 1, wherein said elongated strip-like holder elements comprise a core structure (14) made of plastic and having said opening formed therein;

a metal sheath element (13) surrounding, at least over its major extent, said plastic element;

and wherein said tension bolts comprise ferromagnetic material, the strip-like element forming a guide bushing for said tension bolt passing between neighboring permanent magnets (3-8).

14. Motor according to claim 12, wherein said elongated strip-like holder elements (13; 14, 47) have essentially rectangular cross section with two longitudinal sides bearing against said neighboring side walls of respectively neighboring permanent magnets (3-8);

wherein the strip-like elements are formed with an open slit facing the axis of the motor, and a wall of said strip-like element defines a base (16, 31), said base being guided on the inner wall (9) of the housing (2);

radially inwardly extending projections (11, 12) formed on the inner wall (9) of the housing;

and a guide groove (16, 31) extending longitudinally along said strip-like elements in the wall thereof facing the inner wall of the housing, and dimensioned to receive said inwardly extending projections.

15. Motor according to claim 5, wherein said elongated strip-like holder elements (13; 14, 47) have essentially rectangular cross section with two longitudinal sides bearing against said neighboring side walls of respectively neighboring permanent magnets (3-8);

wherein the strip-like elements are formed with an open slit facing the axis of the motor, and a wall of said strip-like element defines a base (16, 31), said base being guided on the inner wall (9) of the housing (2);

radially inwardly extending projections (11, 12) formed on the inner wall (9) of the housing;

and a guide groove (16, 31) extending longitudinally along said strip-like elements in the wall thereof facing the inner wall of the housing, and dimensioned to receive said inwardly extending projections.

16. Motor according to claim 8, wherein the abutment means (45) comprise axially extending projections projecting toward said permanent magnets (3, 8) from the plate-like means (43) positioned transversely of the shell.

17. Motor according to claim 16, wherein said strip-like holder elements includes plastic material;

and wherein said tension bolts comprise ferromagnetic material, the strip-like element forming a guide bushing for said tension bolt passing between neighboring permanent magnets (3-8).

18. In an electric motor, especially starter motor for an automotive-type internal combustion engine, wherein the motor has an essentially cylindrical housing shell (2);

an end cap (39) closing off the shell at one end (10);

a plate-like means (43) positioned transversely of the shell at an axial position remote from said one end;

a plurality of bowed or arched permanent magnets (3-8) having part-cylindrical configuration fitted into the housing shell and having curved inner and outer walls, essentially radially directed side walls (37, 38) and axially transversely extending end faces (40, 46), a magnet holding arrangement comprising abutment means (45) located radially inwardly of the housing shell and extending axially, bearing against one of the end faces of the permanent magnets (3-8) for providing a counter and locating surface;

a plurality of elongated strip-like holder elements (13; 14, 47) fitted between said part-cylindrical arched permanent magnets (3-8) and engaging neighboring side walls of respective neighboring permanent magnets, said strip-like elements comprising a spacer portion (23, 32) supported with one end against the end cap (39) and extending from the other end faces (40) of the permanent magnets towards said end cap;

circumferentially positioned oppositely directed spring flaps (21, 22; 29, 30; 48) projecting from said strip-like elements at a position to resiliently engage said other of the end faces (40) of the permanent magnets and press axially against said other end faces to thereby resiliently press said one end face of said magnets in engagement with the abutment means;

wherein the strip-like elements are hollow, define an axially extending opening, and are formed, at least in the region between said magnets, with circumferentially resilient deflectable side walls, resiliently pressing against the neighboring side walls of neighboring permanent magnets;

axially extending tension bolts (44) extending through said openings and connected to the end cap (39); and wherein the inner wall (9) of the housing and a wall of said strip-like element engaging the inner wall of the housing are formed, respectively, with projection-and-recess means (11, 12; 16, 31) to guide the position of said elongated strip-like elements and thus locate the permanent magnets (3-8) circumferentially within the housing.

19. In an electric motor, especially starter motor for an automotive-type internal combustion engine, wherein the motor has an essentially cylindrical housing shell (2);

an end cap (39) closing off the shell at one end (10);

a plate-like means (43) positioned transversely of the shell at an axial position remote from said one end;

a plurality of bowed or arched permanent magnets (3-8) having part-cylindrical configuration fitted into the housing shell and having curved inner and outer walls, essentially radially directed side walls (37, 38) and axially transversely extending end faces (40, 46), a magnet holding arrangement comprising abutment means (45) located radially inwardly of the housing shell and extending axially, bearing against one of the end faces of the permanent magnets (3-8) for providing a counter and locating surface;

a plurality of elongated strip-like holder elements (13; 14, 47) fitted between said part-cylindrical arched permanent magnets (3-8) and engaging neighboring side walls of respective neighboring permanent magnets, said strip-like elements comprising a spacer portion (23, 32) supported with one end against the end cap (39) and extending from the other end faces (40) of the permanent magnets towards said end cap;

circumferentially positioned oppositely directed spring flaps (21, 22; 29, 48) projecting from said strip-like elements at a position to resiliently engage said other of the end faces (40) of the permanent magnets and press axially against said other end faces to thereby resiliently press said one end face of said magnets in engagement with the abutment means;

wherein the strip-like elements are hollow, define an axially extending opening, and are formed, at least in the region between said magnets, with circumferentially resilient deflectable side walls, resiliently pressing against the neighboring side walls of neighboring permanent magnets;

axially extending tension bolts (44) extending through said openings and connected to the end cap (39);

wherein said elongated strip-like holder elements comprise a core structure (14) made of plastic and having said opening formed therein;

a metal sheath element (13) surrounding, at least over its major extent, said plastic element;

and wherein said tension bolts comprise ferromagnetic material, and the strip-like element forming a guide bushing for said tension bolt passing between the neighboring permanent magnets (3-8).

* * * * *